United States Patent Office 3,608,439
Patented Sept. 28, 1971

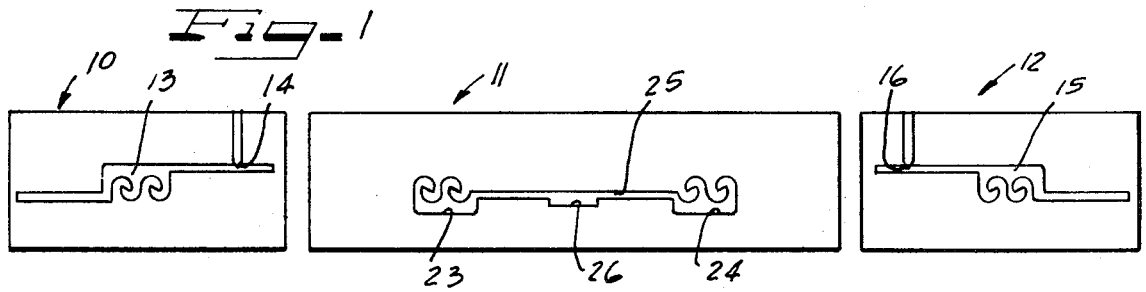
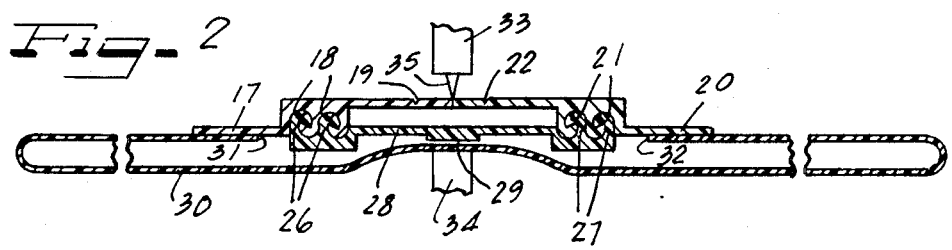
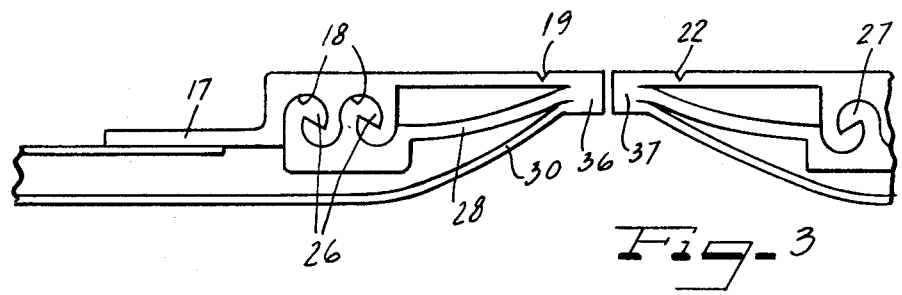
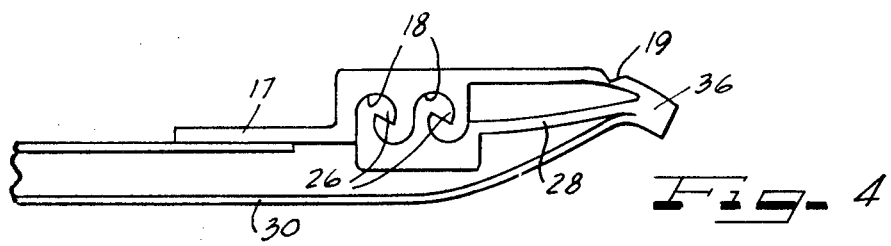
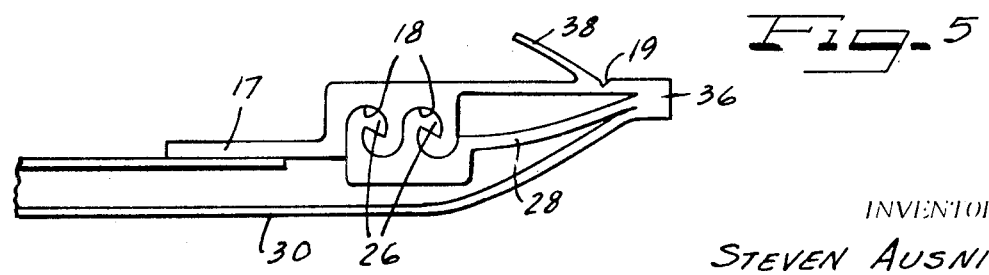
INVENTOR
STEVEN AUSNIT

3,608,439
METHOD OF MAKING A FLEXIBLE PILFER PROOF CLOSURE CONSTRUCTION FOR BAGS
Steven Ausnit, 124 E. 61st St., New York, N.Y. 10021
Filed Feb. 18, 1970, Ser. No. 12,187
Int. Cl. B31b 49/04
U.S. Cl. 93—35R                    10 Claims

ABSTRACT OF THE DISCLOSURE

Method of making bags each with a reclosable opening wherein a sheet of heat sealable material is formed into a split tube, and the split of the tube is covered with a closure strip which is subsequently secured thereto to form a closed tube, the closure strip containing three webs with interlocking rib and groove elements disposed on all three webs with said elements placed between the center of the strip and the extreme marginal edges, and containing two preformed tear lines between said interlocking elements and then having the webs of the closure strip heat sealed at the center of the closure strip and finally securing the tube in the heat sealed area.

BACKGROUND OF THE INVENTION

Field of the invention

This invention is in the field of forming reclosable bags from synthetic resins or the like wherein the bags are formed from continuous tubes, the tubes being formed by securing a closure member to a sheet of heat sealable material in the form of a split tube, followed by heat sealing the webs of the closure member together and severing to form the individual tubes.

DESCRIPTION OF THE PRIOR ART

Closure elements in which the closures are provided by interengaging strips of plastic material have become very commonplace. One of the most common types of configurations for such strips is illustrated in Madsen Pat. No. 2,613,421 owned by the assignee of the present application.

The present invention is directed to a method for the manufacture of fasteners which are substantially pilferproof in that the closure element is not directly accessible from the exterior of the bag, but requires separating or tearing a plastic strip to make it accessible. Fasteners of this general type have been described in U.S. Pat. No. 3,172,443 and U.S. Pat. No. 3,226,787, both owned by the assignee of the present application.

The method of the present invention involves the simultaneous formation of a plurality of closure tubes from which individual bags or pouches can be made. To that extent, it is similar to the subject matter disclosed and claimed in U.S. Pat. No. 3,219,084 which is also owned by the assignee of the present invention. The present invention represents an improvement over the subject matter of the last-named patent by providing among other things, a method for simultaneously forming a plurality of bag-forming tubes with a line of weakness preformed in each tube.

SUMMARY OF THE INVENTION

The present invention provides an improved method for manufacturing bags with reclosable openings wherein a sheet of heat sealable material in the form of an open tube is positioned with its marginal edges in spaced opposed relationship. A closure strip is placed over the marginal edges of the sheet, the closure strip having opposite edges overlying the marginal edges of the sheet and including interlocked webs with releasably interlocking rib and groove elements adjacent the opposite edges of the closure strip, and including preformed tear lines between the interlocking elements. The edges of the strip are secured to the underlying marginal edges of the sheet and then the webs of the closure strip are heat sealed together between the interlocking rib and groove elements. Simultaneously with or after the heat sealing of the webs, the resulting structure is severed along the area of heat sealing to provide two tubes from which the individual bags may be formed.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a somewhat schematic illustration of extrusion dies which can be used to form the elements making up the closure strip of the present invention;

FIG. 2 is a somewhat schematic view of the assembly after the closure strip has been applied to the bag-forming split tube and prior to the heat sealing operation;

FIG. 3 is a view on a somewhat larger scale than FIG. 2, illustrating the assembly after heat sealing and severing in the heat sealed area has been been accomplished;

FIG. 4 is a fragmentary view of one of the bag elements, illustrating the manner in which the outer web of the closure member can be flexed and separated to provide access to the closure elements; and FIG. 5 is a view of a modified form of the invention in which a tab is employed to facilitate tearing open the outer closure strip to provide access to the closure elements.

DESCRIPTION OF THE PREFERRED EMBODIMENTS

In FIG. 1, reference numerals 10, 11 and 12 indicate generally extrusion dies for forming continuous strips of heat sealable material in making up the closure strip of the present invention. The individual strips are made up of a suitable resinous material which is resilient and flexible. The vinyl resins such as polyvinyl chloride, polyvinyl acetate, or copolymers thereof, or polyethylene are particularly suitable for this use.

The extrusion die 10 has a cavity 13 therein in which the plastic material is formed into the shape shown in succeeding figures. The die 10 also includes a knife edge 14 which extends into the cavity 13 to provide a preformed line of weakness for tearing purposes, as will be apparent from the succeeding description.

Die 12 is similar to die 10 in that it includes an extrusion cavity 15 and a knife edge 16 extending therein to provide the preformed line of weakness in the extruded strip.

As seen in FIG. 2 particularly, the strip resulting from the extrusion in die 10 has a flat marginal end portion 17, a pair of ribs and grooves 18 forming part of the separable closure elements, and a preformed tear line 19 resulting from the presence of the knife edge 14 in the die. Similarly, the strip produced in the die 12 has a flat marginal end portion 20, integral ribs and grooves 21 and a tear line 22. The two extruded strips from the dies 10 and 12 which we shall call the outer webs for purposes of convenience are shown in FIG. 2 to be in abutting relation but they can also be overlapped or even separated by a small distance provided that the inner ends of the two web portions are sufficiently close so that they are within the subsequently applied heat sealing field where they are subject to plastic flow. Additionally, dies 10 and 12 can be combined into one die resulting in a single strip.

The other portion of the closure element which we shall call the inner web for purposes of convenience is formed in the die member 11. As seen in FIG. 1, die member 11 has a pair of opposed extrusion cavities 23 and 24 for forming complementary rib and groove type closure elements, with a web-forming cavity 25 therebetween. The extrusion die may also be provided with a centrally disposed recess 26 so that the central portion of the web formed in the die is thickened. As seen in FIG. 2, the inner web which results from the extrusion material in die 11 has rib and groove portions 26 which are releasably engageable with the complementary rib and groove portions 18 of one outer web, and rib and groove portions 27 which are releasably engageable with the ribs and grooves 21 in the other outer web member. The two rib and groove portions of the inner web are connected by means of web portion 28 having a thickened central portion 29 due to the presence of the cavity 26 in the extrusion die.

The marginal edges 17 and 20 of the two outer strips which combine to form the outer webs of the entire closure element are heat sealed or otherwise secured to a sheet 30 of heat sealable resinous material which is arranged in the form of a flattened, open tube with its marginal edges 31 and 32 in spaced opposed relationship.

The next step consists in gathering the 3 ply structure shown in FIG. 2 together for the purpose of providing a heat sealed seam running the length of the assembly. To accomplish this, there is provided a heat sealing element 33 on one side of the assembly, and an anvil 34 on the opposite side. The heat sealing element 33 which may be heated by any suitable means, including high frequency induction fields, may also be provided with a knife edge 35 so that heat sealing may be accomplished simultaneously with slitting of the assembly into separate tubes, as shown in FIG. 3 of the drawings. Alternatively, however, the continuous knife edge 35 may be replaced by a spaced series of slitting or perforating means to provide a line of weakness running the length of the finished assembly so that severing can be carried out after the thermoplastic material has been removed from the heat sealing station.

Severing of the assembly, as illustrated in FIG. 3 results in the production of two continuous collapsed tubes wherein the individual webs making up the assembly are gathered and formed into beads 36 and 37 which form the top of the closure for the finished bags.

The tubes produced by the process described are then severed crosswise and heat sealed to produce individual bags of the desired size. As formed, the closure elements represented by the ribs 26 and the grooves 18 are not accessible for opening the bag, except by tearing the outer web of the closure element along the tear line 19. With the tear line 19 intact, the seller knows that the bag has not been opened or its contents disturbed. When, however, it is desired to open the bag, the outer web is severed at the tear line 19 by flexure of the bead 36 as illustrated in FIG. 4. The provision of the thickened web portion 29 in the closure element initially provides more mass at the bead 36 and provides a greater torque against the line of weakness defined by the tear line 19 when the bag is to be opened.

In another embodiment of the invention shown in FIG. 5, the opening of the bag at the tear line 19 is facilitated by extruding a pull tab 38 as part of the closure element, the pull tab 38 being located in the immediate proximity of the tear line 19 so that a relatively slight pulling pressure on the tab 38 causes the outer web to be severed along the tear line 19.

The method of the present invention thus provides a convenient and economical means for simultaneously forming a plurality of bag making structures each with a preformed tear line therein protecting the integrity of the closure members.

I claim as my invention:

1. The method of making bags with reclosable openings which comprises providing a sheet of heat sealable material in the form of an open tube with its marginal edges in spaced opposed relationship, placing a closure strip over said marginal edges of said sheet, said closure strip having opposite edges overlying the marginal edges of said sheet and including interlocked webs with releasably interlocking rib and groove elements adjacent said opposite edges, and preformed tear lines adjacent said elements, securing said edges to the underlying marginal edges of said sheet, heat sealing said webs together between said interlocking rib and groove elements, so that at least two webs between the interlocking elements are joined together, and severing the resulting structure along the area of heat sealing.

2. The method of claim 1 in which the outer web walls of said closure strip provide edges in closely spaced relation centrally of said closure strip, and said edges are thereafter heat sealed together.

3. The method of claim 1 in which said edges of said outer web wall are placed in abutting relation for heat sealing.

4. The method of claim 1 in which said edges of said outer web wall are placed in overlapping relationship for heat sealing.

5. The method of claim 1 which includes the step of providing a line of weakness in the heat sealed area to facilitate severing the heat sealed article into separate tubes.

6. The method of claim 1 in which the outer web of said closure element has tear lines on either side of the heat sealed area.

7. The method of claim 1 in which the back wall of said bag is heat sealed to said closure strip when the webs of said closure strip are heat sealed together.

8. The method of claim 1 in which the inner web of said closure strip has a thickened portion in the area of heat sealing.

9. The method of claim 1 in which the outer web of said closure strip has a tab formed thereon to facilitate tearing said web along the tear line.

10. The method of claim 5 in which the line of weakness is provided simultaneously with the heat sealing of said webs.

References Cited

UNITED STATES PATENTS 3,219,084  11/1965  Ausnit et al. _____ 150—3

BERNARD STICKNEY, Primary Examiner

U.S. Cl. X.R.

150—3; 229—51 AS, 66